United States Patent [19]

Stewart

[11] Patent Number: 4,867,336
[45] Date of Patent: Sep. 19, 1989

[54] CONTINUOUS LID SEAM

[75] Inventor: David R. Stewart, Richmond, Tex.

[73] Assignee: Shell Oil Company, Houston, Tex.

[21] Appl. No.: 243,380

[22] Filed: Sep. 12, 1988

[51] Int. Cl.$^4$ ............................................. B65D 41/00
[52] U.S. Cl. ...................................... 220/359; 53/449; 53/478; 156/69; 156/272.4
[58] Field of Search ............... 220/359; 156/69, 272.4, 156/274.4; 53/172, 449, 478, 485

[56] References Cited

U.S. PATENT DOCUMENTS

| | | | |
|---|---|---|---|
| 4,211,338 | 7/1980 | Bublitz | 220/359 |
| 4,280,653 | 7/1981 | Elias | 220/359 X |
| 4,420,670 | 5/1983 | Croswell et al. | 219/10.81 |
| 4,435,244 | 10/1984 | Beck et al. | 156/379.8 |
| 4,441,876 | 4/1984 | Marc | 425/174.8 |
| 4,448,345 | 3/1984 | Helms | 229/43 |
| 4,451,721 | 7/1984 | Nemeskeri | 219/10.43 |
| 4,452,842 | 6/1984 | Borges et al. | 220/359 X |
| 4,512,942 | 1/1985 | Babbin et al. | 264/26 |
| 4,757,914 | 7/1988 | Roth et al. | 220/359 |

Primary Examiner—Stephen Marcus
Assistant Examiner—Nova Stucker

[57] ABSTRACT

A process is disclosed for the fabrication of a thermoplastic container having a lid bonded thereto. The container and lid are formed from laminated thermoplastics wherein at least one of the layers that forms the laminate is dielectrically heatable. The heatable layers of the cup and lid are placed in contact with one another, dielectrically heated, and melt together to form a continuous bonded area or lid seam between the cup and lid. The materials of the cup and lid are selected such that the resultant bonded area forms an exygen barrier between the contents of the container and the outside environment. The strength of the bonded area is selected such that the lid may be manually-removed from the container.

11 Claims, 2 Drawing Sheets

CONTINUOUS LID SEAM

BACKGROUND OF THE INVENTION

The invention relates to a method of sealing a plastic lid to a plastic container and the combination produced thereby.

Many plastic containers are made of multiple layers of different plastics in order to achieve the desired barrier properties. For example, tubs, cups, jars and pails (hereinafter termed containers) are made of starting materials which are multi-layered laminates of a plastic which serves as a water or solvent barrier, and a second plastic which serves as an oxygen or air barrier. These barrier layers are usually held together with an adhesive or tie layer which facilitates the formation of the layers into a single sheet or billet, from which the container is made. The typical moisture or solvent barrier plastic is a type of polyolefin such as polypropylene or polyethylene and the typical oxygen barrier plastic is a polyvinyl-alcohol, a polyvinylidene chloride, a nylon, a polyacrylonitril or a polyester. The tie layer is usually made of the polyolefin onto which are grafted some polar monomers, typically containing an acid or anhydride moiety, like polypropylene with maleic anhydride grafted thereto.

The containers are usually made from multilayer sheet or billets by thermoforming or solid phase forming into the desired shape.

The making of these laminates is well known. If two thermoplastics are compatible, they can be laminated by melting at least the surfaces of the pieces in contact with one another and by applying pressure. If the two thermoplastics are not compatible, they can be made into a laminate by placing the tie layer between the incompatible layers.

Once the container has been formed and filled, a lid is fixed to the lip of the container. The lid should be made of a material which affords at least the same barrier properties as the container. The bond between the lid and the container should preferably afford a strong barrier to oxygen and water, yet should be weak enough to be readily removed when the user seeks access to the contents of the container.

One way of solving this sealing problem is to use aluminum lids which are heat-sealed to the container, wherein the lid is provided with an easily opened flap. For example, the aluminum lid may be melted or adhesively bonded to the container and provided with a spiral tear-away tab. A similar solution can be used with a plastic lid, i.e. the plastic lid may be melted to the lip of the container and the lid opened by cutting o tearing through the portion of the lid not bonded to the container. Neither of these solutions yields a reusable lid and often the container is supplied with two lids, one that is destructively removed and a second which is used to reseal the container (such as those currently used o coffee or peanut containers).

Typical methods of bonding a lid to a multilayer plastic container involves the use of an adhesive, spin welding, conventional convection/conductive heating and dielectric heating.

When dielectric heating is used to seal a lid on a container where one or both of the materials of the lid or container were polyolefins, the polyolefins were treated, either on their surfaces or by inclusion of additives in order to get the cup lip and the lid lip to heat to radio frequency or microwave frequencies (0.1-10,000 MHz). Neat polyolefins are essentially transparent to radio frequency or microwave radiation and will not adequately heat. Polymers containing polar moieties, such as vinyl alcohol or vinylidene chloride or copolymers of ethylene and CO will heat when subjected to microwave and/or radio frequency radiation.

A dielectrically heatable thermoplastic is one that absorbs enough power at a frequency between about 0.1 and about 300 MHz, preferably between about 0.1 and about 200 MHz, to melt, at a field strength lower than the arc strength, to melt. Such thermoplastics are generally those with Loss Indexes above about 0.08, preferably above 0.09 and most preferably above 0.1. (Dielectrically non-heatable thermoplastics are those which will not melt at the applied field and frequency. Generally, these thermoplastics are those with Loss Indexes below about 0.07, preferably below about 0.06 and most preferably below 0.05 at the applied field and frequency).

It is desirable that the barrier layers of a combination lid and container entirely surround the contents in order to protect them. It is therefore desirable that when multi-layered polar and non-polar plastics are used in the lip and the container that there be a bond between at least one of the non-polar and one of the polar layers when the lid is sealed to the container. On the other hand, it is desirable that the lid be easily removable without damage to the lid or the container. It is also desirable that the lid be reusable, i.e. that it be such that it can be repeatedly fixed to the container, not bonded to the container but have the capability of snapping onto the container.

The conventional bond and the conventional bonding method used between multilayer plastic lids and containers rely on a compromise. It is conceded that there will be a breach in at least one and probably two of the layers. That is, conventional layered lids and containers are made so that the oxygen barrier layer or layers have at least one moisture barrier layer between the oxygen barrier layer or layers and the environment, and between the oxygen barrier layer or layers and the contents. But, at the weld between the lid and container typically the oxygen barrier layer of the lid and container is not continuous and often one or more of the moisture barrier layers is not continuous. However, typically the thickness of the package at the weld line between the lid and container is considerably more, as much as ten times more, for example, than is the thickness of the body of the container. This increased thickness partially compensates for the break or breaks in the oxygen barrier layer or layers. That is, in a polypropylene, polyvinyl alcohol, polypropylene layered package, polypropylene is not considered a particularly good oxygen barrier when present in a ten (10) mil thickness, as it might be present in the body of a cup. But, when the thickness at the weld line is one hundred (100) mils, it partially compensates for the break in the polyvinyl alcohol which occurs at the weld line between the cup and the lid.

Even so, the risk of food spoilage and/or the occurance of botulism precludes extensive unrefrigerated shelf lifes for containers having breaks in the oxygen barrier. A container and lid assembly system need be developed that results in an unbroken oxygen barrier layer, yet allows the lid to be removed and subsequently placed back on to the container.

SUMMARY OF THE INVENTION

The present invention relates to a combination lid and container and method of making same, wherein the barrier layers are continuous over the entire package but the thickness of the weld line between the container and lid is minimized and is approximately equal to the thickness of the layers. The lid and container are made of at least a plastic oxygen barrier layer and preferably a plastic moisture barrier layer on either side of the oxygen barrier layer. The bonded area between the lid and container preferably includes the oxygen barrier layer and only part of each moisture barrier layer.

More specifically the invention comprises a combination container and peelable lid where at least one of the combination is a laminate of at least two thermoplastic layers, at least one of the thermoplastic layers being dielectrically heatable and at least one of the thermoplastic layers being dielectrically non-heatable.

For the case of a container or lid made from a single layer, the single layer would be a dielectrically heatable thermoplastic which is compatible with at least one of the dielectrically heatable layers of any plural layer laminated part. At least one of the dielectrically heatable layers would be in direct contact with the dielectrically heatable layer of the other part when the lid is on the container. An example of this type of combination would be a container made of a laminate of a layer of polypropylene, a tie layer of a graft polymer of polypropylene and maleic anhydride, and another layer of polyvinylidene chloride., and a lid part made of polyvinylidene chloride. Another example of this type of combination would be a lid made of a laminate of a polypropylene layer, a tie layer of a polypropylene maleic anhydride graft copolymer, and a polyvinyl chloride layer, with the container made of polyvinyl chloride.

One preferred embodiment of the invention is a laminated container and laminated lid, each made of at least one layer of compatible dielectrically heatable thermoplastic and at least one dielectrically non-heatable thermoplastic and where at least one dielectrically heatable layer of the container is in direct contact with at least one compatible dielectrically heatable layer of the lid when the lid is on the container.

A particularly preferred combination is one where both the container and the lid are laminates having the same matched sequence of layers of thermoplastics and where the heatable layers and the non-heatable layers are in matched contact when the lid is on the container. This embodiment is especially useful when the heatable layer is between two non-heatable layers and the heatable layer is an air barrier and the non-heatable layer is a water barrier. An example of the above would be a lid and a container both made from a laminate having a 40 mil layer of polypropylene, a 5 mil layer of a graft copolymer of polypropylene and maleic anhydride (a tie layer), a 10 mil layer of a copolymer of vinyl alcohol and ethylene, a 5 mil layer of a graft copolymer of polypropylene and maleic anhydride (a tie layer), and a 40 mil layer of polypropylene.

The geometry of the lip of the lid and the lip of the container must be such that at least art of the heatable layer of one part of the combination and part of the heatable layer of the other part are in contact, the two heatable layers being compatible. It is also preferred that part of the non-heatable layer of a laminate be in contact with the other part. A particular preferred geometry for the combination is to have at least one compatible heatable layer of each part in contact with one another and at least one compatible non-heatable layer no more than a tie layer away from the heatable layer of each part in contact. The most preferred geometry is one where a compatible heatable layer on each part and compatible non-heatable layers on either side of the heatable layer are in contact.

The lid of the present invention is also peelable, being attached to the container with a bond strong enough to hold the lid on the container but which may be manually broken and peeled away. If the force is to be supplied by the average human, a peel resistance of between about 5 and about 10 psi, preferably between about 5 and about 8 psi should be the resistance generated by the width of the bond. Where the available force is to be applied with a mechanical enhancement (a bottle opener, for example), the peelable bond resistance can be somewhat higher.

It is therefore an object of the invention to provide an openable container having a resealable lid.

It is a feature of the present invention to use radio frequency radiation to bond dielectrically-heatable oxygen barrier layers of the container and the lid together.

These and other features, objects, and advantages of the present invention will become apparent from the following detailed description, wherein reference is made to the Figures in the accompanying drawings.

IN THE DRAWINGS

FIG. 1 is a pictorial view of a typical container 20 and lid 21 made by thermoforming, vacuum forming or solid phase forming from a sheet or billets of thermoplastic, both the container and lid having electrodes 31 placed adjacent the container/lid bonded area.

FIG. 2 is a schematic representation in partial cross section of the container and lid cut along line 2—2 of FIG. 1 wherein the lid 21 is made of a single heatable thermoplastic layer 24 and the container is a laminate made of a heatable thermoplastic layer 24 and a non-heatable layer 25, separated by tie layer 27.

FIG. 3 is a schematic representation in partial cross section of an alternative embodiment of the apparatus of FIG. 2, wherein the lid 21 and container 20 are laminates and wherein the compatible heatable layers 24 and the compatible non-heatable layers 25 are in contact and the bonded area 28 between the lid 21 and container 20 is between the heatable layers 24, the tie layer 27, and a small part of the non-heatable layers 25.

FIG. 4 is a schematic representation in partial cross section of an alternative embodiment of the apparatus of FIG. 2, wherein the container 20 and lid 21 have their lips 22 and 23 formed in a stepped fashion.

FIG. 5 is a schematic representation in partial cross section of a close-up of the bonded area 28 of FIG. 4.

DESCRIPTION OF THE PREFERRED EMBODIMENTS

Figure 1:
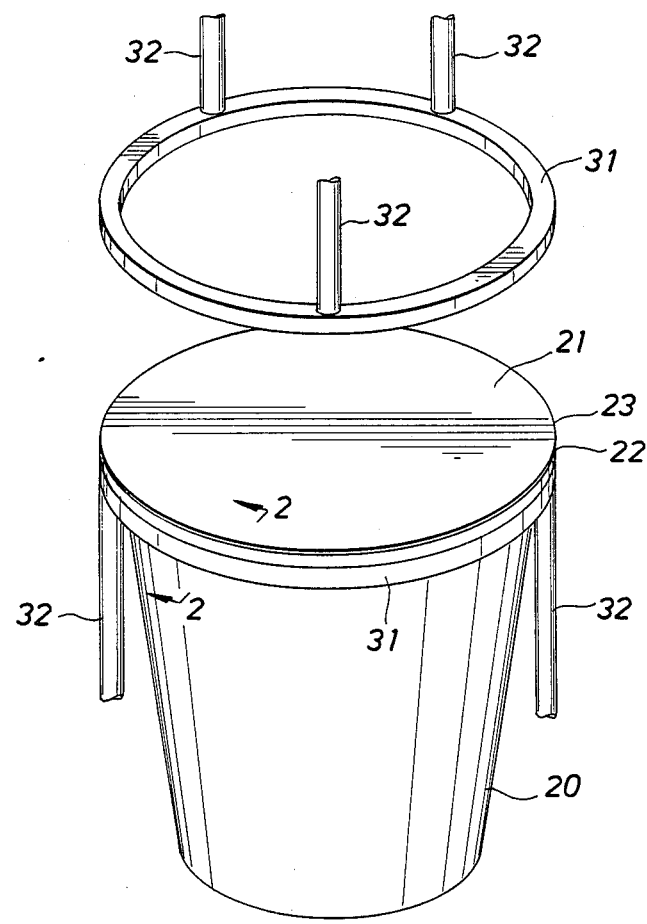

FIG. 1 is a view of a typical container 20 and lid 21 made by thermoforming, vacuum forming or solid phase forming from sheet or billets. The container lip 22 is sealed to the lid lip 23.

Figure 2:
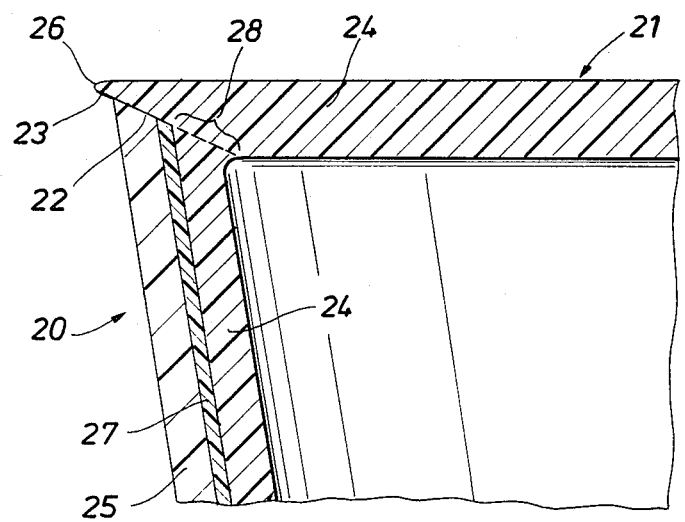

FIG. 2 is a two-dimensional cross section of the container and lid cut along line 2—2 of FIG. 1 wherein the lid 21 is made of a single heatable thermoplastic layer 24 and the container is a laminate made of a heatable thermoplastic layer 24 and a non-heatable layer 25, separated by tie layer 27.

The thickness of the heatable portion of the container is such that the bonded area 28 between the compatible heatable portions of the container lip and the lid lip is peelable, i.e. a force of about 5 to about 8 psi can break the bond and peel off the lid. There is no bond between the non-heatable layer 25 and the lid 21 because either the non-heatable layer does not melt and/or the heatable thermoplastic lid 21 is not compatible with the non-heatable layer 25.

Figure 3:
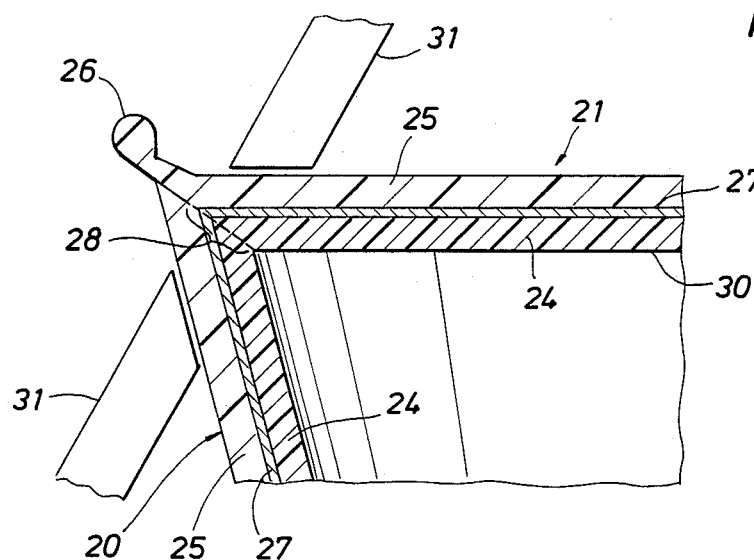

FIG. 3 is an alternative embodiment of the apparatus of FIG. 2 wherein the lid 21 and container 20 are laminates and where the compatible heatable layers 24 and the compatible non-heatable layers 25 are in contact and the bonded area 28 between the lid 21 and container 20 is between the heatable layers 24, the tie layer 27, and a small part of the non-heatable layers 25.

In both the embodiments of FIGS. 2 and 3 there is a overhang 26 which serves as a convenient place to grip and apply force to peel the lid off.

Figure 4:
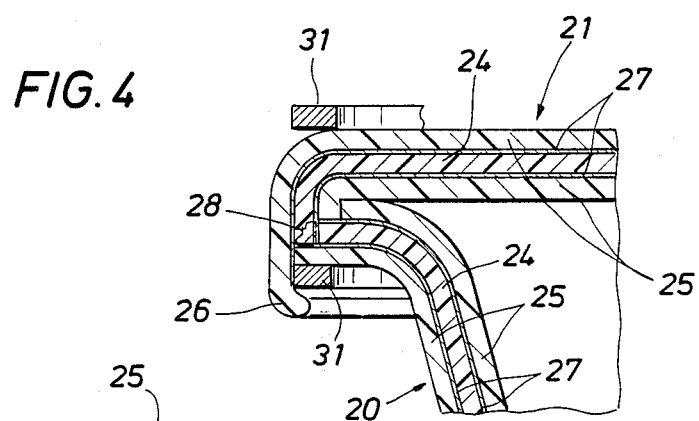

FIG. 4 is a third embodiment of FIG. 2 wherein the container 20 and lid 21 have their lips formed in a stepped fashion. Such a container 20 and lid 21 can be formed out of billets made by laminating a stack of different size billets using heat and pressure. The sequence of the layers 24, 25 and 27 and the size of the layers 24, 25 and 27 are such that the heatable layer 24 of the lid 21 is in contact with the heatable layer 24 of the container 20. In FIG. 4, the layers 27 form tie layers. In a combination as depicted in FIG. 4, the heatable layer 24 could be an oxygen barrier such as a copolymer of vinyl alcohol and ethylene or polyvinylydene chloride. The non-heating tie layer 27 could be a water barrier such as a graft copolymer of polypropylene and maleic anhydride, and the non-heating layer could be polypropylene.

Figure 5:
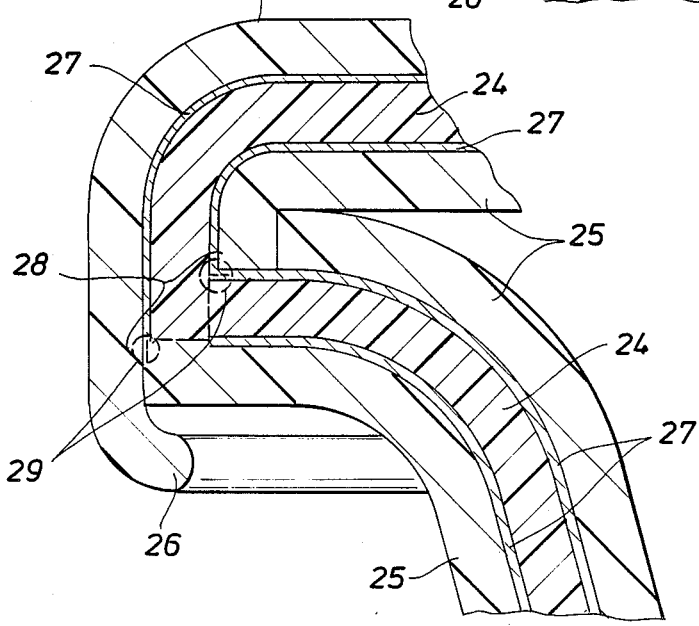

FIG. 5 is a close-up of the bonded area 28 of FIG. 4. The heat generated by heating the heatable layer 24 in a RF field can melt a small part of the other layers by conduction. A little pressure will cause a small part of the non-heatable tie layer 27 and non-heatable polypropylene layer 25 to form an end portion 29 of the bonded area 28. This gives the bonded area 28 both an oxygen barrier and a water barrier component while still remaining narrow enough, i.e. weak enough, to be manually peelable.

The embodiments of FIGS. 3 and 4 illustrate another feature of the invention. The overhang 26 which serves as the handle to peel off the lid ca be shaped to reseal the lid to the container. The lid 21 can be peeled off, i.e. the bonded area 28 can be broken but the lid 21 can thereafter be replaced and the overhang 26 which is flexible will hold the lid on the container. The embodiment of FIG. 3 is also tamper-resistant in that the overhang 26 is placed so that once the bonded area 28 is broken the lid 21 must be turned over to reseal the container. It should be well understood that many other overhang 26 designs may be used to accomplish the same mechanical result of resealing the container.

The absence of the overhang 26 sticking up or a signal placed on the underside 30 of the lid 21 could alert the consumer that the lid 21 had been opened on the container 20.

Referring again to FIGS. 3–5 the container lip 22 and the lid lip 23 can be seen to be thicker than the bonded area 28. It is the thinness of the bonded area which allows the lid 21 to be removable from the container 20. The narrowness of the bonded area can be varied by varying the width of the heatable layer 24. This width, together with the strength of the heatable thermoplastic, determines the force needed to peel the lid 21 from the container 20.

The geometry of the lips 22 and 23 and the sequence of the layers in the laminate when both parts are laminates determine how much of the compatible heatable layers 24 will be in contact and, therefore, form the bonded area. The layers can be any shape provided a layer of heatable thermoplastic on one part is in contact at every point on the lip with a compatible heatable thermoplastic on the other part. The outer periphery of the container can be any shape such as curvalinear or polyhedral or a combination of curvalinear or polyhedral provided the lid is the same shape and the above-described contact is made.

The lamination of the heatable layers of the two parts may be accomplished by radio frequency heating by placement of a first RF electrode above and a second electrode below the juncture of the container lip 22 and the lid lip 23 and thereafter by application of a field while applying pressure. The frequency of the field is between about 0.1 and about 300 MHz, preferably between about 0.1 and about 200 MHz. The strength of the field is dependent on the desired rate of temperature rise and the strength at which the system will arc.

FIGS. 1, 3 and 4 show a preferred placement of the electrodes 31. FIG. 1 shows the lid 21 on the container 20 with the electrodes 31 in their preferred placement. The electrodes are connected to a RF generator as is well known to the art, (not shown). The electrodes are placed adjacent the lips 22 and 23 so as to minimize the amount of heatable polymer between the electrodes. It is possible to place the whole container and lid between RF electrodes; but this results in the heating of all of the heatable thermoplastic, which is a waste of power. While the whole container 20 and lid 21 could be between the electrodes, it is preferred that only the lips be between the electrodes and most preferably only that part of the lips which will eventually become the bonded area 28.

In order to form the bond, it is necessary to melt the surfaces and to apply a pressure to force the lid 21 onto the container 20. Only a small amount of pressure is needed, preferably above about 0.5 psi, more preferably above 5 psi and most preferably between about 5–100 psi. It is preferred that the pressure be applied only to the lips 22 and 23, most preferably by the electrodes 31 on either side of the bonded area 28. FIG. 1 shows the electrodes 31 with a press connection 32 which are connected to a press (not shown) to supply the needed pressure.

Many other variations and modifications may be made in the apparatus and techniques hereinbefore described by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A thermoplastic container comprising a cup having a first lip and a lid having a second lip, said lips being sealingly bonded wherein at least the first lip is a laminate made of at least one dielectrically heatable thermoplastic and at least one dielectrically nonheatable thermoplastic, and at least a portion of the second lip is made of thermoplastic compatible with the dielectrically-heatable thermoplastic of the first lip where the geometry of the lips and the sequence of the layers in the laminate or laminates are such that at least a continuous portion of the heatable thermoplastic of the first lip is in contact with a continuous portion of the compatible thermoplastic of the second lip when the lid is on the cup, said lips being sealingly bonded by;

contacting said lips together, dielectrically heating at least that portion of the heatable thermoplastic in the first lip until it melts, and applying pressure to increase the bonded area between the lips, wherein the bonded area is selected such that the lid may be peeled from the cup.

2. The container of claim 1 wherein the compatible thermoplastic of the second lip which contacts the dielectrically heatable thermoplastic layer of the first lip, is dielectrically heatable.

3. The container of claim 2 wherein both of the lips are laminates of at least one dielectrically heatable thermoplastic layer and at least one dielectrically nonheatable thermoplastic layer.

4. The container of claim 3 wherein there is a nonheatable layer on both sides of at least one heatable layer.

5. The container of claim 4 wherein the sequence of layers in the lid lip matches the sequence of layers in the cup lip and each layer in the lid lip is essentially the same size as its matched layer in the cup lip.

6. The container in claim 5 wherein each layer of the lid is compatible with each matched layer of the cup.

7. The container in claim 5 wherein each layer of the lid is made of the same thermoplastic as its matched layer in the cup.

8. The container of claims 2, 3, 4, 5, 6 or 7 where the heatable thermoplastic is selected from the group consisting of a polyvinyl alcohol, a polyvinylydene chloride or a nylon and the nonheatable thermoplastic is a polyolefin polymer or copolymer.

9. The container of claim 7 wherein the materials of the sequence of layers is polypropylene, polypropylene/maleic anhydride graft copolymer, a copolymer of vinyl alcohol and ethylene, polypropylene/maleic anhydride graft copolymer, and polypropylene.

10. The container of claim 9 wherein the thickness of the vinyl alcohol/ethylene copolymer layer is about 10 mils.

11. A thermoplastic container comprising a cup having a first lip and a lid having a second lip, said lips being sealingly bondable to one another wherein at least the first lip is a laminate made of at least one dielectrically heatable thermoplastic and at least one dielectrically nonheatable thermoplastic, and at least a portion of the second lip is made of thermoplastic compatible with the dielectrically-heatable thermoplastic of the first lip where the geometry of the lips and the sequence of the layers in the laminate or laminates are such that at least a continuous portion of the heatable thermoplastic of the first lip is contactable with a continuous portion of the compatible thermoplastic of the second lip when the lid is on the cup, said lips capable of sealed bondage together by;

contacting said lips together, dielectrically heating at least that portion of the heatable thermoplastic in the first lip until it melts, and applying pressure to increase the bonded area between the lips, wherein the resultant bonded area is selected such that the lid may be peeled from the cup.

* * * * *